United States Patent [19]

Regalbuto et al.

[11] Patent Number: 4,505,018

[45] Date of Patent: Mar. 19, 1985

[54] UNDERWATER STUD GUN SYSTEM AND METHOD FOR ATTACHING AN ARTICLE TO AN UNDERWATER STRUCTURE

[75] Inventors: John A. Regalbuto; Glenn B. Christopher, both of Fort Worth; Jerry D. Motley, Arlington, all of Tex.

[73] Assignee: Jet Research Center, Inc., Arlington, Tex.

[21] Appl. No.: 415,780

[22] Filed: Sep. 8, 1982

[51] Int. Cl.³ ........................ B23P 11/00; B25C 1/08

[52] U.S. Cl. ........................................ 29/432; 29/254; 29/526 R; 227/9; 411/441

[58] Field of Search ..................... 29/254, 432, 526 R; 227/9, 8; 411/440, 441; 114/52, 54; 405/195, 211, 158, 232

[56] References Cited

U.S. PATENT DOCUMENTS

| | | | |
|---|---|---|---|
| 2,666,252 | 1/1954 | Temple | 29/432 |
| 2,722,004 | 11/1955 | Webber et al. | 29/432 |
| 2,770,194 | 11/1956 | Kopf et al. | 411/440 X |
| 3,494,018 | 2/1970 | Helderman et al. | 29/432 |
| 3,517,469 | 6/1970 | Brown | 52/155 |
| 3,565,312 | 2/1971 | Temple et al. | 227/9 |
| 3,742,591 | 7/1973 | Ritter et al. | 29/525 |
| 3,768,412 | 10/1973 | Darlick | 29/432 |
| 4,060,188 | 11/1977 | Monson | 227/9 |
| 4,102,238 | 7/1978 | Thurner | 29/526 R X |
| 4,180,351 | 12/1979 | Orrill et al. | 405/303 |
| 4,213,239 | 7/1980 | Filer | 29/252 X |
| 4,287,656 | 9/1981 | Glassman et al. | 29/432 |

FOREIGN PATENT DOCUMENTS

| | | | |
|---|---|---|---|
| 1503034 | 10/1969 | Fed. Rep. of Germany | 227/9 |
| 1936740 | 2/1971 | Fed. Rep. of Germany | 227/9 |
| 2069387 | 8/1981 | United Kingdom | 29/252 |

OTHER PUBLICATIONS

A photocopy of four sheets of handwritten notes describing a system for underwater connection of anodes.

A photocopy of p. 16 of a brochure illustrating Hilti brand explosive fasteners.

*Popular Science*, vol. 169, No. 6, (Dec. 1956), p. 156.

J. Jones, "Unmanned Vehicles Place Subsea Anodes", *Offshore*, (Aug. 1982), pp. 98–102.

*Primary Examiner*—Charlie T. Moon
*Assistant Examiner*—Ronald S. Wallace
*Attorney, Agent, or Firm*—Joseph A. Walkowski; Thomas R. Weaver

[57] ABSTRACT

A cartridge loaded stud gun and a complementary anode attachment fitting provide a system for explosively attaching a sacrificial anode to a subsea structure. The system is capable of being operated by a remote-controlled vehicle, and contains a means for orienting the gun and sensing its alignment in order to prevent firing the gun with the barrel canted relative to the subsea structure, a position which might permit ricocheting of the fired stud.

32 Claims, 3 Drawing Figures

UNDERWATER STUD GUN SYSTEM AND METHOD FOR ATTACHING AN ARTICLE TO AN UNDERWATER STRUCTURE

The present invention relates generally to the art of explosive fastening, and more particularly, to an underwater stud gun system for attaching a sacrificial anode to a subsea structure, which system is capable of being operated by a remote-controlled vehicle.

When replacing sacrificial anodes at great depths, for example, on the order of 1,000 feet deep, the use of human divers is very expensive. The task generally involved is that of fastening an anode attachment fitting to a tubular steel member which may be from 12 to 42 inches or more in diameter and having a wall from ½ to ¾ or more inch thick. Internal stiffeners and heat affected weld zones may exist in the target area for attachment. The tube may be water or air filled. The external surface of the tubular member may be covered with slime and/or marine growth up to one inch thick.

It is desirable that a physically strong structural attachment be provided which also provides good electrical continuity between the subsea structure and the anode.

The prior art includes the concept of carrying an anode and an anode attachment fitting on a remote-controlled vehicle and connecting the anode attachment fitting to a subsea structure by use of an explosively set pin carried by the fitting and driven through the anode attachment fitting into a wall of the subsea structure.

The present invention is directed to a particular system of a stud gun and anode attachment fitting for attaching an anode to a subsea structure. The system includes an anode attachment fitting having a fastener receiving passage disposed therein. This passage includes an inlet, an outlet, and is at least partially defined by a tapered annular inner shoulder of the anode attachment fitting, which shoulder faces away from the outlet of the passage.

The system further includes a stud gun having a barrel with a cylindrical barrel bore disposed therein. The barrel is connected to the anode attachment fitting so that an outlet of the barrel bore is aligned with and adjacent the inlet of the fastener receiving passage.

The system further includes a cartridge disposed in the barrel bore of the stud gun. The cartridge has a fastener disposed therein to be propelled from the barrel bore of the stud gun upon the firing of a propellant charge contained in the cartridge. The fastener includes a tapered outer surface means for engaging the tapered annular inner shoulder of the anode attachment fitting and for thereby limiting the movement of the fastener through the fastener receiving passage and tightly engaging the fastener upon impact of the tapered outer surface means of the fastener with the tapered annular inner shoulder of the anode attachment fitting.

Numerous objects, features and advantages of the present invention will be readily apparent to those skilled in the art upon a reading of the following disclosure in conjunction with the accompanying drawings.

Figure 1:
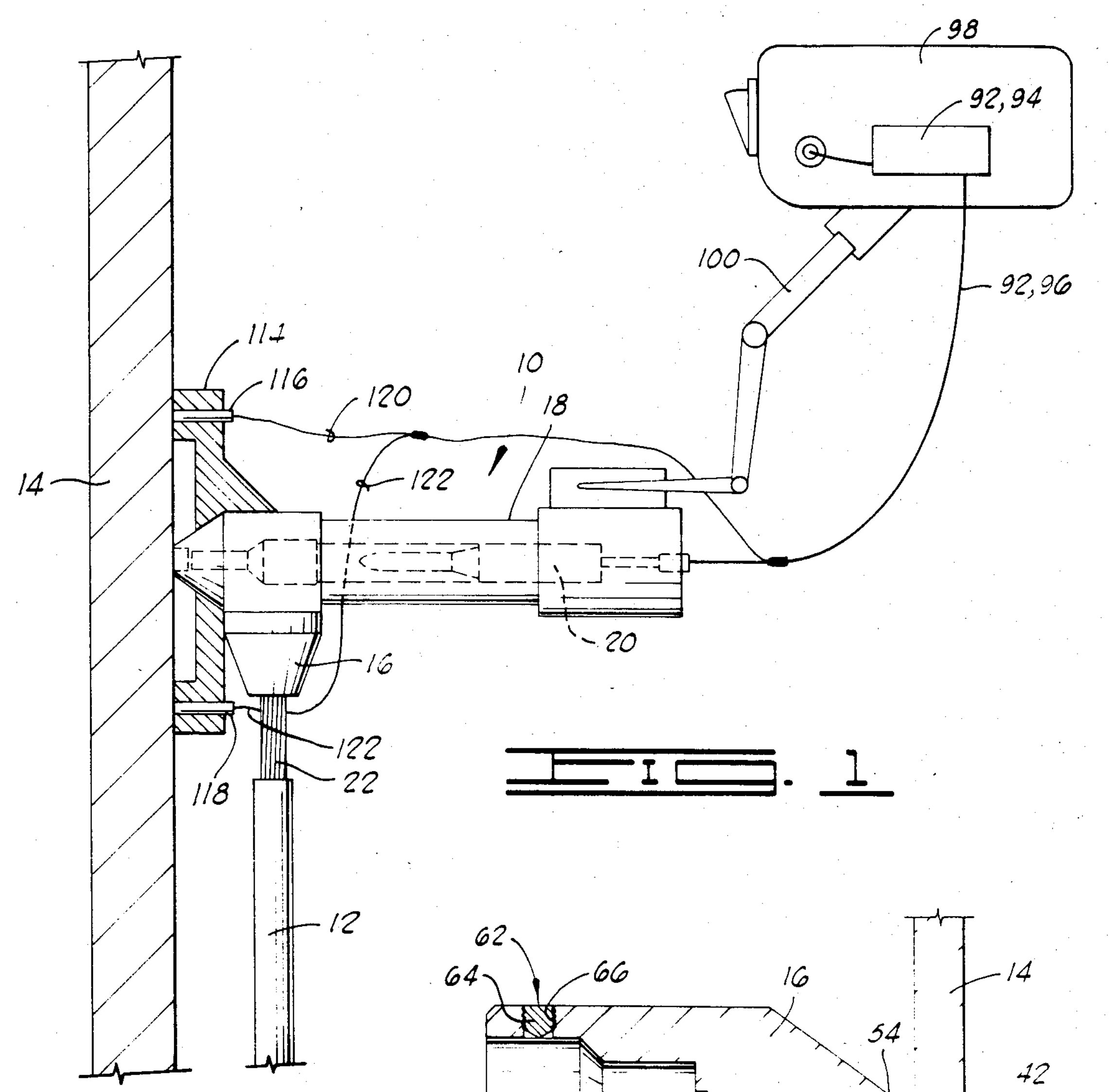
FIG. 1 is a schematic illustration of the stud gun and anode attachment fitting of the present invention assembled together and being carried by a remote-controlled vehicle into engagement with a wall of a subsea structure.

Referring now to the drawings, and particularly to FIG. 1, the system of the present invention is shown and generally designated by the numeral 10. The system 10 provides a means for attaching a sacrificial anode 12 to a wall 14 of a subsea structure.

The system 10 includes an anode attachment fitting 16, a stud gun 18, and a cartridge 20 received in the stud gun 18.

The anode 12, which is a conventional sacrificial anode having a weight (on land) on the order of six hundred to seven hundred and fifty pounds, is mechanically and electrically attached to the anode attachment fitting 16 by a steel cable 22.

Figure 2:
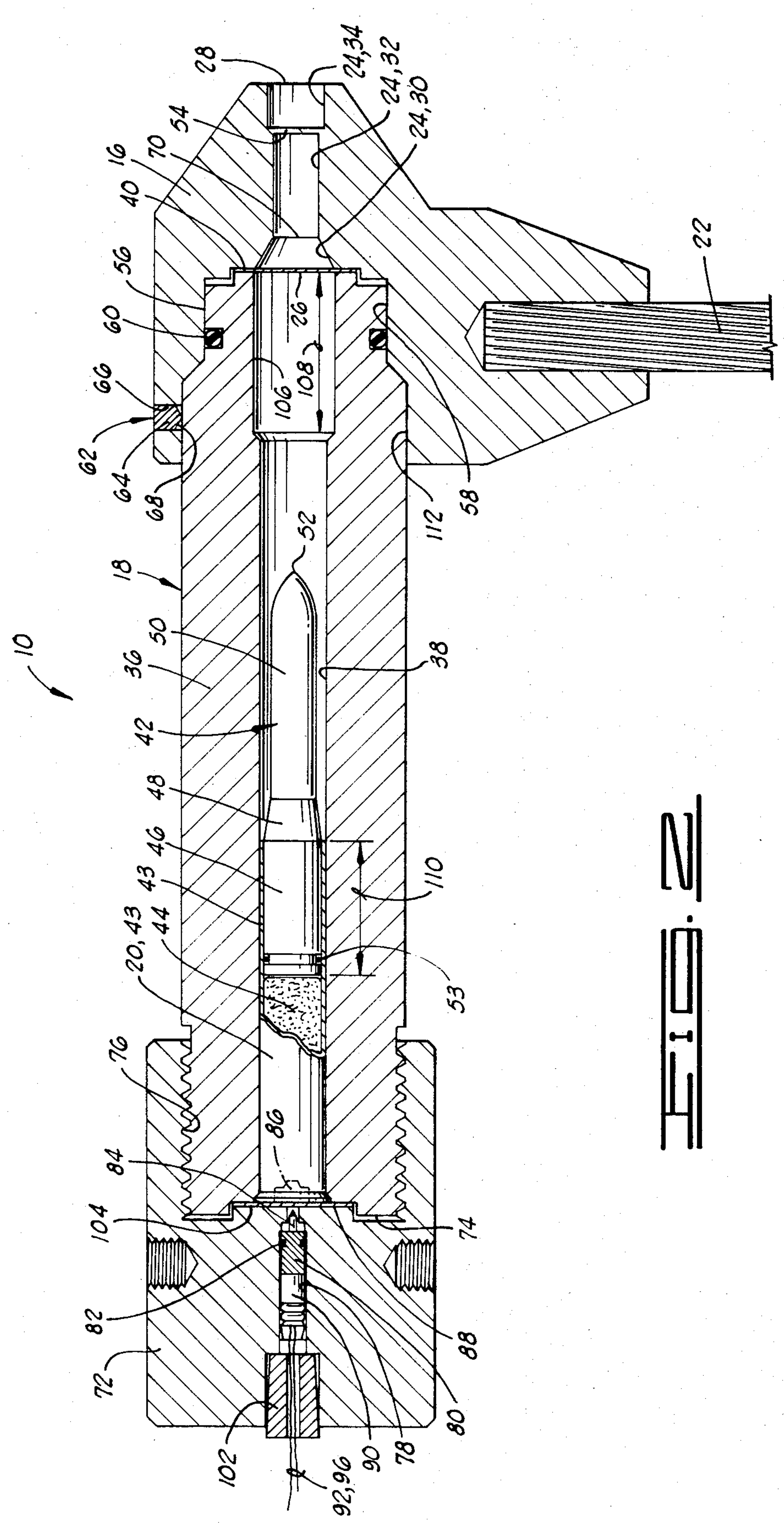
FIG. 2 is a section view of the stud gun and anode attachment fitting of the present invention with a cartridge disposed therein.

Referring now to FIG. 2, the construction of the system 10 is there shown in greater detail.

The anode attachment fitting 16 has a fastener receiving passage 24 disposed therein. The fastener receiving passage 24 includes an inlet 26 and an outlet 28.

The passage 24 is itself defined by a tapered annular inner shoulder 30, a cylindrical pilot bore 32, and a cylindrical counterbore 34.

As seen in FIG. 2, the tapered annular inner shoulder 30 faces away from the outlet 28 of passage 24.

The stud gun 18 includes a barrel 36 having a cylindrical barrel bore 38 disposed therein.

The barrel 36 is connected to the anode attachment fitting 16 so that an outlet 40 of barrel bore 38 is aligned with and adjacent the inlet 26 of passage 24.

The cartridge 20 is disposed in the barrel bore 38 of stud gun 18. The cartridge 20 has a fastener 42 disposed in a casing 43. The fastener 42 is ejected from the barrel bore 38 of stud gun 18 upon the firing of a propellant charge 44 contained in the cartridge 20. The propellant charge may comprise black powder of the grade commonly known as "pistol38 powder.

The fastener 42 includes a cylindrical rearward portion 46, a tapered outer surface means 48, and a cylindrical forward piercing portion 50 having a point 52 on a forward end thereof. A resilient O-ring seal 53 is provided between rearward portion 46 and the casing 43.

The tapered outer surface means 48 of fastener 42 provides a means for engaging the tapered annular inner shoulder 30 of the passage 24 of anode attachment fitting 16. This engagement thereby limits forward movement of the fastener 48 through the fastener receiving passage 24. The tapered surface 48 of fastener 42 tightly engages the fastener 42 with the tapered shoulder 30 of anode attachment fitting 16 upon impact of the tapered outer surface means 48 of fastener 42 with the tapered annular inner shoulder 30 of anode attachment fitting 16.

The anode attachment fitting 16 includes a water seal diaphragm 54 for preventing entry of water through the fastener receiving passage 24 until the diaphragm 54 is pierced by the fastener 42.

The barrel 36 of stud gun 18 is sealingly engaged with the anode attachment fitting 16 so that water is prevented from entering the barrel bore 38 prior to the firing of the propellant charge 44. This sealing engagement is provided by the fact that the barrel 36 has an outer cylindrical surface 56 closely received within a cylindrical counterbore 58 of anode attachment fitting 16, with an annular resilient sealing means 60 disposed between said outer cylindrical surface 56 and said counterbore 58.

Without the noted means for preventing entry of water into receiving passage 24 and barrel bore 38 prior to firing of propellant charge 44, fastener 42 would not attain sufficient velocity to pierce wall 14 of the subsea structure absent an extremely large propellant charge. A large propellant charge in turn would require a much heavier walled stud gun and attachment fitting to avoid rupture from the detonation of the propellant charge. The presence of water in barrel bore 38 and fastener receiving passage 24 would also result in anode fitting 16 being pushed away from wall 14 by a jet of water preceding fastener 42; as close proximity to wall 14 is necessary for fastener 42 to achieve a secure mechanical and electrical connection for fitting 16 with wall 14, the reaction force of such a water jet would obviously be undesirable.

The counterbore 58 is concentric with the inlet 26 of the fastener receiving passage 24.

A friction means 62 is operably associated with the stud gun 18 and the anode attachment fitting 16 for adjusting a frictional engagement of the stud gun 18 with the anode attachment fitting 16. This friction means is provided by an adjustable set screw 64 threadably disposed in a threaded bore 66 of anode attachment fitting 16, with a radially inner end 68 of set screw 64 extending into engagement with said barrel 36.

The pilot hole portion 32 of fastener receiving passage 24 is located between the smallest end 70 of tapered annular inner shoulder 30 and said outlet 28 of fastener receiving passage 24. Pilot hole portion 32 provides a means for guiding the piercing portion 50 of fastener 42 into engagement with the wall 14 of the subsea structure.

An outside diameter of cylindrical piercing portion 50 of fastener 42 is less than an inside diameter of the cylindrical pilot hole portion 32, so that piercing portion 50 of fastener 42 can be received within pilot hole portion 32.

As the fastener 42 moves forward through the fastener receiving passageway 24, it pierces the water seal diaphragm 54. This water seal diaphragm 54 is preferably located between the pilot bore portion 32 and the outlet 28 of passage 24, and most preferably, separates the pilot bore portion 32 from the counterbore 34 as shown in FIG. 2. This most preferable placement allows diaphragm 54 to peel back against the walls of counter bore 34 as it is pentrated by fastener 42, permitting unobstructed contact of fastener 42 with wall 14 of the subsea structure. It is noted, however, that the water seal diaphragm may be placed across the outlet 28 of the passage 24. While it is possible to do so, it is not desirable for diaphragm 54 to be placed near or at inlet 26 of passage 24, as the presence of water in passage 24 will reduce the effectiveness of fastener 42, as previously noted. Although the water seal diaphragm 54 is shown in FIG. 2 as being an integrally constructed part of the anode attachment fitting 16, the water seal diaphragm may be a separate member which sealingly engages the anode attachment fitting 16 to seal the passage 24.

The stud gun 18 further includes a breech block, which may also generally be referred to as a head portion 72.

The head portion 72 is detachably attached to a rear end 74 of the barrel 36, so that the head portion 72 and the barrel 36 may be disassembled to allow placement of the cartridge 20 in the barrel bore 38. The head portion 72 and barrel 36 are preferably threadedly connected together as by threads 76.

The head portion 72 has a firing pin bore 78 disposed therein concentric with and axially aligned with the barrel bore 38.

A firing pin piston 80 is slidably received in firing pin bore 78 and sealingly engages the firing pin bore 78 by means of a resilient O-ring seal 82. A firing pin 84 extends axially forward from the firing pin piston 80 toward a primer 86 disposed in a rear end 88 of cartridge 20.

A detonator means 90 is disposed in firing pin bore 78 behind the firing pin piston 80. Detonator means 90 provides a means for creating an initial force to drive the firing pin piston 80 forward so that the firing pin 84 impacts the primer 86 to initiate the firing of the propellant charge 44 of the cartridge 20.

As seen in FIGS. 1 and 2, a control means 92 is provided for controlling detonation of the detonator means 90.

Preferably, the detonator means 90 is of the exploding bridge wire type, and the control means 92 includes a high energy firing module 94 and an electrical conductor 96 connecting the firing module 94 to the detonator means 90.

The high energy firing module 94 is itself a conventional item and is available in the prior art.

As shown in FIG. 1, the high energy firing module 94 is preferably carried by a remote-controlled vehicle 98 which also includes a robot arm 100 which manipulates the position of the stud gun 18.

The electrical conductor 96 conducts an electrical signal to the detonator means 90 to fire the same.

A plug means 102 is disposed in a rear end of firing pin bore 78 for sealing the firing pin bore 78 about the electrical conductor 96 to prevent water from entering the firing pin bore 78.

Preferably, a separator membrane 104 is sandwiched between head portion 72 and barrel 36 of stud gun 18 for separating the firing pin 84 from the primer 86. The separator membrane is preferably a copper disc having dimensions on the order of $1\frac{1}{2}$ inches diameter and 0.005 inches thickness. Separator membrane 104 prevents the migration of water into barrel bore 38 if plug 102 and O-ring 82 fail to seal completely. Furthermore, separator membrane 104 prevents firing pin 84 from contacting primer 86 prematurely due to the urging of hydrostatic pressure behind firing pin 84 as the stud gun goes from the surface of the water to its firing depth, thus reducing the possibility of a misfire.

The barrel bore 38 of barrel 36 includes an enlarged diameter counterbore portion 106 at a forward end thereof. The counterbore portion 106 has a length 108 greater than a length 110 of rear portion 46 of fastener 42. In this manner, when the fastener 42 is received in the anode attachment fitting 16, the rear portion 46 of fastener 42 will then only loosely be received within barrel 36.

The barrel 36 itself is detachably connected to the anode attachment fitting 16 so that it may be disconnected from the anode attachment fitting 16 after the anode attachment fitting 16 is itself attached to the wall 14 of the subsea structure.

This detachable connection is provided by a friction fit of the barrel 36 with an inner cylindrical surface including the counterbore 58 and a second counterbore 112 of anode attachment fitting 16. Also, the frictional engagement of set screw 62 with the barrel 36 provides an adjustment to the total friction fit between barrel 36 and anode attachment fitting 16. Since this is only a frictional engagement, barrel 36 of stud gun 18 is pushed out of engagement with the anode attachment fitting 16 when the stud gun 18 is fired.

When the stud gun 18 is fired, the fastener 42 travels forward through the barrel bore 38, entering counterbore portion 106, at which point the gases created by the firing of propellant charge 44 bypass O-ring 53 and flow beside fastener 42. The piercing portion 50 of fastener 42 then enters passage 24, the cylindrical portion of piercing portion 50 being received within the cylindrical pilot bore 32 to guide the engagement of the fastener 42 with the wall 14 of the subsea structure. The fastener 42 pierces the diaphragm 54 and continues to travel forward through the passage 24 until the tapered surface 48 of fastener 42 engages the tapered annular shoulder 30 of anode attachment fitting 16.

Figure 3:
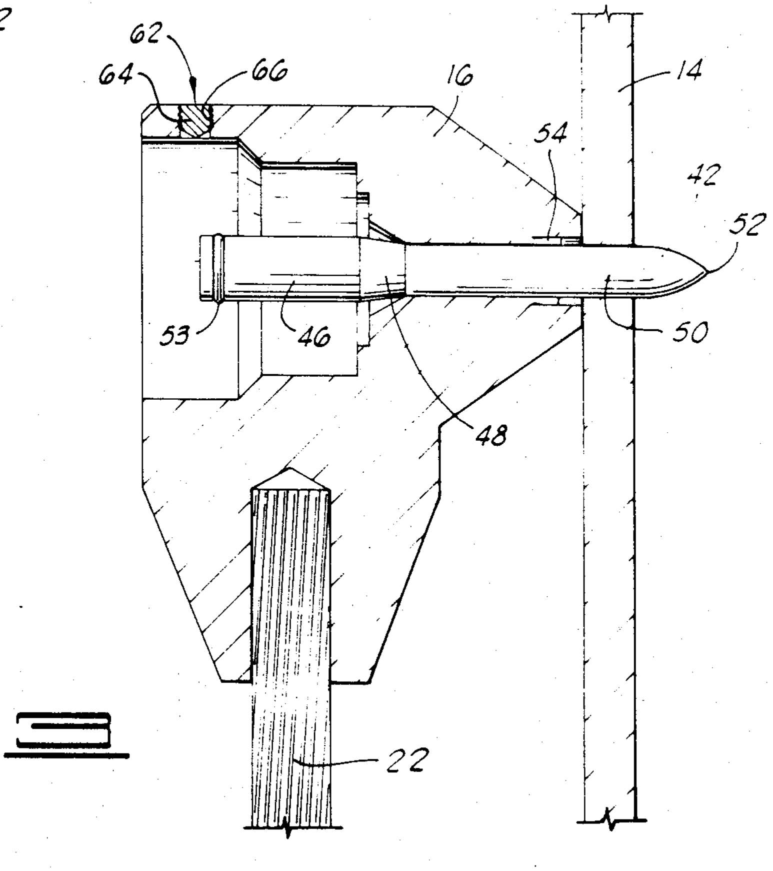
FIG. 3 is a view of the anode attachment fitting as attached to the wall of the subsea structure.

At that point, a forwardmost part of the piercing portion 50 of fastener 42 has pierced the wall 14 of the subsea structure as shown in FIG. 3. It has also, of course, pierced any exterior slime or marine growth which might be present on wall 14.

Any additional kinetic energy of the fastener 42 which remains after the fastener 42 pierces the wall 14 is dissipated by engagement of the tapered surface 48 with the tapered annular shoulder 30. The tapered surface 48 tightly wedges into the tapered annular shoulder 30 so that this remaining kinetic energy is absorbed by elastic deformation of the fitting 16 and the tapered surface 48 thus providing an extremely tight connection between the fastener 42 and the anode attachment fitting 16. This tight fit provides a very effective structural and electrical connection between the wall 14, anode attachment fitting 16 and fastener 42.

As fastener 42 tightly engages anode attachment fitting 16, the pressurized gases from the firing of propellant charge 44 are trapped between stud gun 18 and anode attachment fitting 16, which pressure forces barrel 36 out of counterbore 58, overcoming the friction fit between barrel 36 and anode attachment fitting 16, and the added friction of set screw 62.

Often, the wall 14 of the subsea structure is a curved wall of a tubular structural support member. Thus it is important to orient the stud gun 18 substantially perpendicular to and in the plane of the longitudinal axis of the structural member. Otherwise, fastener 42 may ricochet off of wall 14, or bend or shear upon striking it. Furthermore, substantial perpendicularity of the fastener 42 when fired from stud gun 18 assures a tight mechanical fit as well as a good electrical connection between fastener 42 and wall 14.

Preferably, an orientation sensing means 114, as seen in FIG. 1, is operably associated with the stud gun 18 for sensing a perpendicularity of the stud gun 18 to the wall 14 of the subsea structure.

Sensors 116, 118 and a third sensor (not shown) provide electrical signals through wires 120, 122 and a third wire (not shown) to high energy firing module 92. When the three sensors indicate the substantially perpendicular orientation of stud gun 18 relative to wall 14, the high energy firing module initiates the firing of stud gun 18.

Thus it is seen that the apparatus and methods of the present invention readily achieve the ends and advantages mentioned as well as those inherent therein. While certain preferred embodiments of the invention have been illustrated for the purposes of this dislcosure, numerous changes in the arrangement and construction of parts may be made by those skilled in the art which changes are encompassed within the scope and spirit of the present invention as defined by the appended claims.

What is claimed is:

1. A system for attaching an article to an underwater structure, comprising:
   an article attachment fitting having a fastener receiving passage disposed therein, said passage including an inlet, an outlet, and being at least partially defined by a tapered annular inner shoulder of said fitting facing away from said outlet;
   a stud gun having a barrel with a cylindrical barrel bore disposed therein, said barrel being connected to said attachment fitting so that an outlet of said barrel bore is aligned with and adjacent said inlet of said fastener receiving passage; and
   a cartridge disposed in said barrel bore of said stud gun, said cartridge having a fastener disposed therein to be ejected from said barrel bore of said stud gun into said fastener receiving passage upon the firing of a propellant charge contained in said cartridge, said fastener including a tapered outer surface means adapted to engage said tapered annular inner shoulder of said attachment fitting as said fastener moves through said fastener receiving passage and to thereby limit the movement of said fastener through said fastener receiving passage, said tapered outer surface means further providing a means for tightly engaging said fastener with said attachment fitting.

2. The system of claim 1, wherein:
   said attachment fitting includes a water seal diaphragm means for preventing passage of water through said fastener receiving passage until said fastener pierces said diaphragm.

3. The system of claim 2, wherein:
   said barrel of said stud gun is sealingly engaged with said attachment fitting so that water is prevented from entering said barrel bore prior to the firing of said propellant charge.

4. The system of claim 2, wherein:
   said barrel has an outer cylindrical surface closely received within a cylindrical counterbore of said attachment fitting, said counterbore being concentric with said inlet of said fastener receiving passage; and
   said system includes resilient annular sealing means, disposed between said outer cylindrical surface of said barrel and said counterbore, for preventing water from entering said barrel bore prior to the firing of said propellant charge.

5. The system of claim 4, further comprising:
   a friction means, operably associated with said stud gun and said attachment fitting, for adjusting a frictional engagement of said stud gun with said attachment fitting.

6. The system of claim 5, wherein:
   said friction means is an adjustable set screw, threadedly disposed in said attachment fitting with an end of said set screw extending into engagement with said barrel.

7. The system of claim 1, wherein:
   said barrel of said stud gun is sealingly engaged with said attachment fitting so that water is prevented from entering said barrel bore prior to the firing of said propellant charge.

8. The system of claim 1, wherein:

said barrel has an outer cylindrical surface closely received within a cylindrical counterbore of said attachment fitting, said counterbore being concentric with said inlet of said fastener receiving passage; and said system includes resilient annular sealing means, disposed between said outer cylindrical surface of said barrel and said counterbore, for preventing water from entering said barrel bore prior to the firing of said propellant charge.

9. The system of claim 8, further comprising:

a friction means, operably associated with said stud gun and said attachment fitting, for adjusting a frictional engagement of said stud gun with said attachment fitting.

10. The system of claim 9, wherein:

said friction means is an adjustable set screw, threadedly disposed in said attachment fitting with an end of said set screw extending into engagement with said barrel.

11. The system of claim 1, wherein:

said fastener receiving passage includes a pilot hole portion, located between a smallest end of said tapered annular inner shoulder and said outlet of said fastener receiving passage, for guiding a piercing portion of said fastener into engagement with said subsea structure.

12. The system of claim 11, wherein:

said pilot hole portion is further characterized as a cylindrical pilot hole portion.

13. The system of claim 12, wherein:

said piercing portion of said fastener is located forward of said tapered outer surface means thereof, and said piercing portion is cylindrical in shape with a pointed forward end, with an outside diameter of said piercing portion being less than an inside diameter of said cylindrical pilot hole portion of said passage.

14. The system of claim 11, wherein:

said attachment fitting includes a water seal diaphragm means for preventing passage of water through said fastener receiving passageway until said fastener pierces said diaphragm.

15. The system of claim 14, wherein:

said diaphragm is located between said pilot hole portion and said outlet of said fastener passage.

16. The system of claim 1, wherein:

said stud gun further includes a head portion detachably attached to a rear end of said barrel, so that said head portion and said barrel may be disassembled to allow placement of said cartridge in said barrel bore.

17. The system of claim 16, wherein:

said head portion and said barrel are threadedly connected together.

18. The system of claim 16, wherein:

said head portion has a firing pin bore disposed therein concentric with and axially aligned with said barrel bore.

19. The system of claim 18, further comprising:

a firing pin piston, slidably and sealingly received in said firing pin bore, and having a firing pin extending axially therefrom toward a primer disposed in a rear end of said cartridge;

detonator means, disposed in said firing pin bore behind said firing pin piston, for creating an initial force to drive said firing pin piston forward so that said firing pin impacts said primer to cause said primer to initiate the firing of said propellant charge of said cartridge; and control means for controlling a detonation of said detonator means.

20. The system of claim 19, wherein:

said control means is an electrical control means and includes an electrical conductor, connected to said detonator means, for conducting an electric signal to said detonator means.

21. The system of claim 20, further comprising:

plug means, disposed in a rear end of said firing pin bore, for sealing said firing pin bore about said electrical conductor to prevent water from entering said firing pin bore.

22. The system of claim 19, further comprising:

a separator membrane, sandwiched between said head portion and said barrel of said stud gun, for separating said firing pin from said primer.

23. The system of claim 1, wherein:

said barrel bore includes an enlarged diameter counterbore portion at a forward end thereof, said counterbore portion having a length greater than a length of a rear portion of said fastener behind said tapered outer surface means of said fastener.

24. The system of claim 1, wherein:

said barrel is detachably connected to said attachment fitting so that said barrel may be disconnected from said attachment fitting after said attachment fitting is fastened to said underwater structure.

25. The system of claim 24, wherein:

an outer cylindrical surface of said barrel is friction fit within an inner cylindrical surface of said attachment fitting, so that pressurized gases generated by the firing of the propellant charge of the cartridge in said stud gun pushes said barrel out of engagement with said attachment fitting.

26. The system of claim 1, wherein:

said tapered annular inner shoulder of said fastener receiving passage provides a means for dissipating a kinetic energy of said fastener after said fastener pierces a wall of said underwater structure.

27. The system of claim 1, further comprising:

orientation sensing means for sensing relative perpendicularity of said stud gun to said underwater structure.

28. A method of attaching an article to an underwater structure, said method comprising the steps of:

assembling together:

an article attachment fitting having a fastener receiving passage disposed therein, said passage including an inlet, an outlet, and being at least partially defined by a tapered annular inner shoulder of said fitting facing away from said outlet;

a stud gun having a barrel with a cylindrical barrel bore disposed therein, said barrel being connected to said attachment fitting so that an outlet of said barrel bore is aligned with and adjacent said inlet of said fastener receiving passage; and a cartridge disposed in said barrel bore of said stud gun, said cartridge having a fastener disposed therein to be ejected from said barrel bore of said stud gun upon the firing of a propellant charge contained in said cartridge, said fastener including a tapered outer surface;

engaging said attachment fitting with a wall of said underwater structure so that said outlet of said fastener receiving passage is adjacent said wall;

measuring relative perpendicularity of said barrel relative to said wall of said subsea structure;

orienting said barrel substantially perpendicular to said subsea structure;

firing said propellant charge of said cartridge;

thus propelling said fastener forward through said barrel bore into said fastener receiving passageway with a forward end of said fastener extending out said outlet of said fastener receiving passage and piercing said wall of said underwater structure;

stopping forward motion of said fastener upon engagement of said tapered outer surface of said fastener with said tapered annular inner shoulder of said fitting; and dissipating a kinetic energy of said fastener by tightly wedging said tapered outer surface of said fastener into said tapered annular inner shoulder of said fitting.

29. The method of claim 28, further comprising the step of:

guiding said fastener's penetration of said wall by providing a cylindrical pilot hole portion in said fastener receiving passage and by providing a cylindrical portion on said fastener forward of said tapered outer surface of said fastener, said cylindrical portion of said fastener being received in said cylindrical pilot hole portion of said passage to guide said fastener's penetration of said wall.

30. The method of claim 28, further comprising the step of:

preventing water from entering said barrel bore prior to said firing step.

31. The method of claim 30, wherein:

said preventing step is accomplished by providing a water seal diaphragm across said fastener receiving passage of said attachment fitting.

32. The method of claim 28, further comprising the step of removing said barrel from said attachment fitting with pressurized gas generated in said barrel bore by said firing.

* * * * *